3,389,353
STRUCTURE FOR MOUNTING
SUPERCONDUCTIVE COILS
Wilhelm Kafka, Tennenlohe, and Dieter Kullmann, Erlangen, Germany, assignors to Siemens Aktiengesellschaft, a corporation of Germany
Filed Nov. 25, 1966, Ser. No. 597,130
Claims priority, application Germany, Dec. 7, 1965, S 100,831
7 Claims. (Cl. 335—216)

ABSTRACT OF THE DISCLOSURE

A superconductive coil is supported within a tubular coaxial housing with the aid of tension rods which extend radially to the outside of the housing and are subject to contraction due to refrigeration of the coil. A stop carried by the housing limits the amount of contraction and then forms a rigid connection between tension rod and housing. A spring on the tension rod provides a yielding force opposing the contraction.

---

Figure 1:
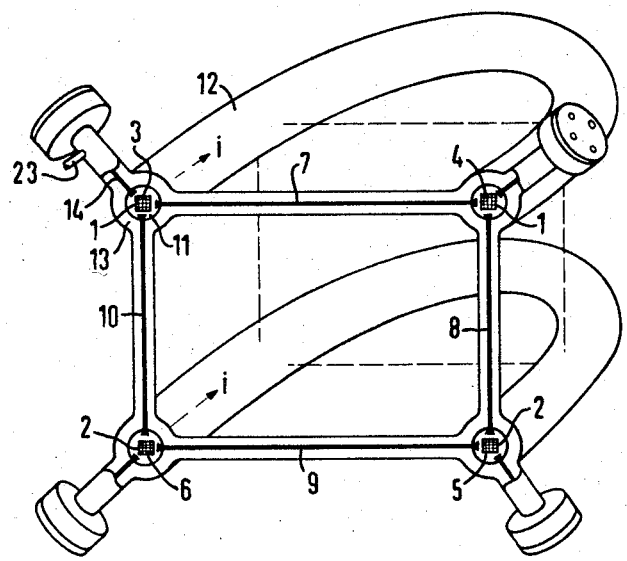

Our invention relates to superconductive apparatus.

More particularly, our invention relates to a superconductive apparatus which includes a superconducting coil, and our invention relates especially to that part of an apparatus of this latter type which serves to mount the coil.

Superconducting coils must, as is known, be arranged in a heat-insulated manner within a housing in which the coil is refrigerated. As a result there are difficulties in absorbing the forces which occur upon excitation or upon rotary movement of the coil, these forces acting between the coil and the housing in which it is situated.

In order to solve this latter problem it has already been proposed to provide, for a coil which is carried by a suitable support means in the hollow interior of a housing in which the coil is situated in a heat insulated manner and in which the coil is refrigerated, tension rods which are fixed to the housing so as to mount the coil therein surrounded by heat-insulating material and spaced from the inner surface of the housing. With an apparatus of this type a pressure-sensitive heat-insulating material, composed, for example, of reflecting, crumpled foil, having great heat resistance, can be used, since the forces between the coil support means and the housing are absorbed by the tension rods. There is, however, the difficulty of adjusting the coil support means in a simple manner and to render the adjusted position of the coil support means independent of the thermal changes in length. It is customary to adjust the position of the coil support means at room temperature. When the superconducting coil is subsequently refrigerated, the tension rods are also necessarily refrigerated down to a temperature in the region of absolute zero, so that the tension rods tend to contract. However, such contraction is not possible due to the fixed connection provided by the tension rods between the coil support means and the housing, and the result is that there are tremendous mechanical stresses which must be absorbed by the housing. In order to prevent the load from becoming too great, it is necessary to make the tension rods themselves elastic to a very high degree. This latter construction of the tension rods is of considerable disadvantage, however, because during operation of the superconductive apparatus undesirable changes in the length of the tension rods will occur as a result of the large magnetic forces which are encountered or, in the case where the coil is in a rotary machine, as a result of the large centrifugal forces which are encountered. In the event that these latter operating forces are non-symmetrical with respect to the entire coil arrangement, then the support means which carries the coil is displaced with respect to one part of the housing in which it is located to such an extent that the heat-insulating material becomes compressed at this location where the displacement occurs with the result that a very poor heat insulation is provided at the region where the insulation is compressed.

It is, therefore, a primary object of our invention to avoid the above drawbacks.

In particular, it is an object of our invention to provide a construction where the tension rod need not be made in and of itself in such a way that it has such a high degree of elasticity that it will change its length due to the operational forces of the apparatus, so that in this way the above-discussed undesirable results will be avoided.

However, the objects of our invention also include a structure which will enable the contraction forces acting on the tension rod to be absorbed without unduly loading the housing.

In particular, it is an object of our invention to provide to a construction which will enable the tension rods to contract as a result of the lowering of a temperature thereof and as a result of the tendency of the tension rods to contract from other sources, while at the same time providing the equivalent of a rigid connection between the coil supporting structure and the housing during operation of the apparatus.

The superconducting coil will normally be carried by a suitable support means which is situated in the hollow interior of a housing means spaced from the inner surface of the latter. In accordance with our invention, a plurality of tension rod means are connected to the coil support means and extend therefrom toward the exterior of the housing means in which the coil and its support means are located. The housing means of our invention carries a stop means which is situated in the path of movement of part of at least one of the tension rod means so as to limit the extent to which at least this one tension rod means can contract, the extent of contraction being determined by the maximum increment of movement permitted by the stop means, and also in accordance with our invention a spring means coacts with at least the latter one tension rod means to oppose contracting movement thereof. In this way when the limit of the extent of contraction of the tension rod means, determined by the stop means, is reached, the equivalent of a rigid connection between the coil support means and the housing means through the tension rod means is provided, and by arranging the stop means to provide a maximum increment of contracting movement of the tension rod means required by the refrigerating thereof as well as other sources which induce contraction of the tension rod, it is possible to inhibit further contracting movement of the tension rod means so as to provide the equivalent of a rigid tension rod extending between and connected to the housing and coil support means, during operation of the apparatus.

Figure 2:
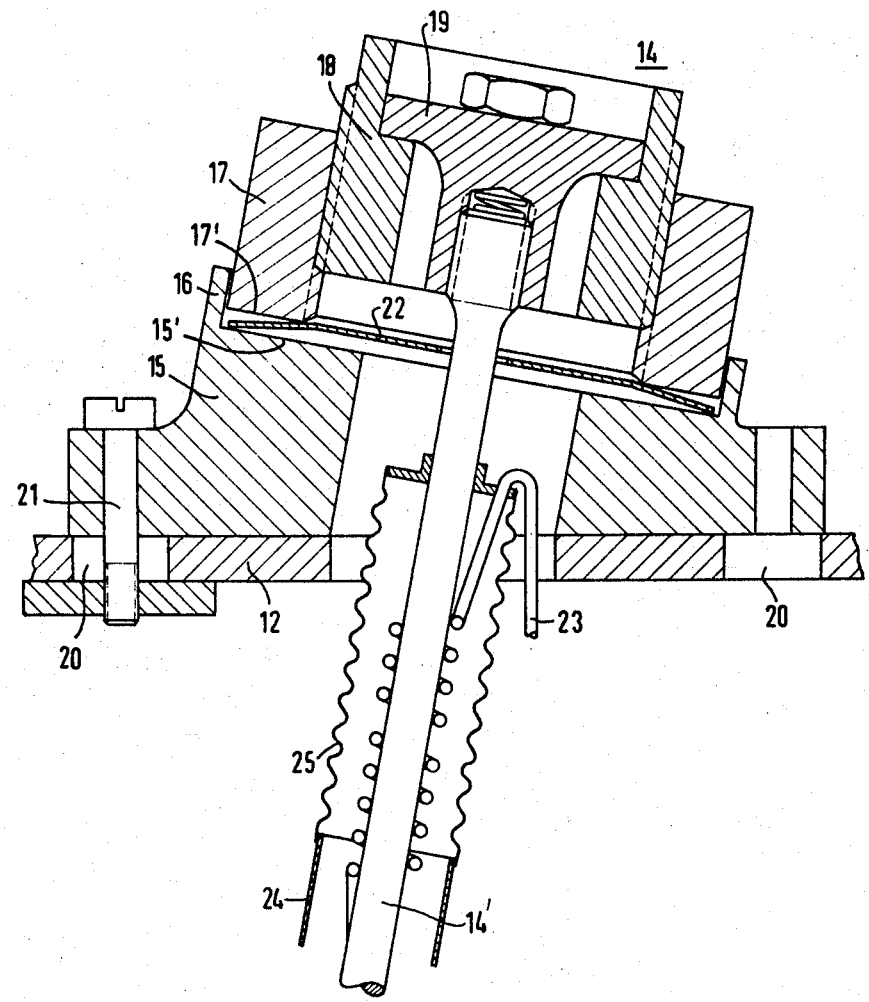

Our invention is illustrated by way of example in the accompanying drawings which form part of our application and in which:

FIG. 1 is a schematic perspective illustration of one possible embodiment of a superconductive apparatus which includes the structure of our invention, the structure of FIG. 1 being taken in a plane passing transversely through the apparatus so that only that part of the structure which is situated at one side of the latter plane is illustrated; and FIG. 2 shows, on an enlarged scale as compared to FIG. 1, in a sectional fragmentary elevation the details of one possible embodiment of a structure according to our invention.

Referring now to FIG. 1, there is schematically illustrated therein a two-pole winding composed of a pair of elliptical coils 1 and 2 through which the current $i$ flows, the current flowing in the same direction through both coils. As a result there are forces of repulsion acting between the coil parts 3–6, and these forces of repulsion are absorbed by tension rods 7–10. These tension rods are fixed to the elongated coil-support means 11 which extends along and carries the coils, the coils being completely surrounded and housed in a fluid-tight manner within the support means 11. The support means 11 for each coil 1 and 2 may include, for example, elongated members which are suitably recessed to receive the coil in its interior and which engage each other with suitable sealing members situated between the parts of the support means, these parts being tightly pressed against each other through suitable bolts or the like.

The coils together with the support means 11 are situated within a tubular housing means 12 having a hollow interior defined by an inner surface of the housing means, and it will be noted that the support means 11 together with the coils therein are spaced from the inner surface of the housing means 12. Situated between the inner surface of the housing means 12 and the support means 11, in the space 13, is a suitable heat-insulating material in which the support means 11 are embedded, and a plurality of additional tension rod means 14 are operatively connected on the one hand to the support means 11 and on the other hand to the housing means 12 for determining the position of the support means and coils within the housing means 12. The plurality of tension rod means 14 are tensioned between the pair of support means 11 and the wall of the housing means 12.

FIG. 2 illustrates the details of the connection between one of the tension rod means 14 and the housing means 12, the tension rod means 14 including a tension rod 14′ which at its inner end is threaded into a suitable threaded opening formed in one of the support means 11. The housing means 12 carries at its exterior surface a stop means 15 having an annular stop surface 15′ directed away from the interior of the housing means 12. The stop means 15 is in the form of a rigid annular member made of a suitable metal, for example, and it will be seen that this stop means surrounds the tension rod 14′ with considerable clearance. In addition the stop means 15 has a lip 16 extending outwardly beyond the annular stop surface 15′, and this lip 16 has an inner peripheral surface of non-circular configuration. Thus, the inner surface of the lip 16 may have a hexagonal configuration, for example.

The tension rod means 14 includes in addition to the tension rod 14′ an outer annular member 17 which has an inner end surface 17′ directed inwardly toward the interior of the housing means 12 and facing the surface 15′ of the stop means 15. This annular member 17 has an exterior surface which is closely surrounded by the interior surface of the lip 16 and which is of a mating hexagonal configuration, so that the lip 16 of the stop means 15 serves to guide the member 17 for movement toward and away from the stop surface 15′ while at the same time the member 17 is prevented from turning with respect to the stop means 15. The inner surface of the annular member 17 is threaded, so that the member 17 has the construction of a nut. Thus, the member 17 forms a part of the tension rod means 14 which faces the stop means 15 so that the latter is located in the path of movement of this part of the tension rod means 14 when the latter contracts.

A sleeve member 18 also forms part of the tension rod means 14, and this sleeve member 18 has an exterior thread which is received in the interior thread of the annular member 17. The interior of the sleeve member 18 is provided with an annular shoulder directed away from the interior of the housing means 12 and engaged by a motion transmitting member 19 of the tension rod means 14, this motion transmitting member 19 being formed with a threaded bore into which the outer end of the rod 14′ is threaded, with a spring interposed between the inner end of the threaded bore of motion transmitting member 19 and the outer end of the rod 14′, as indicated in FIG. 2. Thus, during contraction of the tension rod 14′ the motion transmitting member 19 will transmit the contracting movement thereof through the shoulder of the sleeve 18 to the latter, and this movement will be transmitted from the sleeve 18 to the annular member 17. The sleeve 18 can be turned with respect to the member 17 so as to adjust the axial position of the tension rod 14′. In this way it is possible to adjust the tension rod means so that the motion transmitting member 19 is prevented from turning. Also, this construction provides the possibility of adjusting the tension rod 14′ in its axial direction.

A transverse adjustment of the tension rod means can be carried out by way of the circular openings 20 which are formed in the wall of the housing means 12 and which have a diameter substantially greater than the bolts 21 which respectively extend through the openings 20. These bolts 21 extend through bores formed in an outer flange of the stop means 15 and are threaded into suitable nut members engaging the inner surface of the housing 12, so that by loosening the bolts 21 it is possible to shift the entire stop means 15 and the entire tension rod means 14 within the limits of the play of the bolts 21 in the openings 20, respectively, so that a transverse adjustment can be made.

The structure of our invention also includes a spring means 22 which is operatively connected with the tension rod means 14 for yieldably and resiliently opposing the contracting movement thereof, so that the spring means 22 resiliently opposes the movement of the member 17 toward the stop surface 15′. In the illustrated example the spring means 22 takes the form of a single cup spring formed with a central aperture through which the rod 14′ extends with clearance, and the outer peripheral portion of the cup spring 22 engages the surfaces 15′ and 17′ and urges the surface 17′ away from the surface 15′. The distance between the surfaces 15′ and 17′ at room temperature is designed, taking into consideration the thickness of the cup spring 22, to limit the movement of the surface 17′ toward the surface 15′ to an extent required by contraction of the rod 14′ during refrigerating thereof and resulting from other sources of contracting stresses which act on the rod 14′, so that at the operating conditions of the apparatus the cup spring 22 is completely compressed and rigidly held between and in engagement with the surfaces 15′ and 17′, acting in the same way as a solid spacer situated between these surfaces, so that during operation the connection of the tension rod means 14 to the housing means 12 is the same as if there were not spring means 22 interposed between the stop means 15 and the tension rod means 14. As a result during operation the structure behaves in the same manner as if the rod 14′ were directly connected to the housing means 12. At the same time excessive stressing of the housing means 12 due to contraction of the rod 14′ is avoided, and furthermore it is not necessary to make the rod 14′ so highly elestic that it will yield due to magnetic or centrifugal forces encountered during operation of the superconductive apparatus. Thus, during the operation of the apparatus the cup spring 22 forms the equivalent of a rigid spacer situated between and engaging the surfaces 15′ and 17′.

FIG. 2 also shows a return conduit 23 for the refrigerating medium, this element also forming part of the constructive solution to the problems encountered in superconductive apparatus. This return conduit 23 is coiled about the rod 14′ and reduces the flow of heat from the outer end of the tension rod which is substantially at room temperature. It is also possible to reduce this flow of heat by providing heat-insulation for the parts 15-19 and by cooling these parts with liquid nitrogen. The tension rod 14' is surrounded by a metal sleeve 24 which at its outer end portion takes the form of a metal bellows 25. Within the sleeve 24 is situated a suitable heat-insulating material.

As a result of the use of the intermediate spring 22, the thermally induced change in length is absorbed practically without any stressing of the tension rod. At the superconductive operating temperature, the action of the spring is eliminated because of the limited extent of deflection of the spring resulting from situating the latter between the surfaces 15' and 17', so that during operation the same relationship obtain as would be present if there were no intermediate spring or member 22.

We claim:

1. In a superconductive apparatus, a superconductive coil, support means extending along and supporting said coil, housing means having a hollow interior defined by an inner surface of said housing means, said support means being situated in the hollow interior of said housing means, a plurality of tension rod means connected with said support means and extending therefrom toward the exterior of said housing means, said plurality of tension rod means situating said support means in said housing means spaced from said inner surface thereof and said plurality of tension rod means being subject to contraction forces resulting from refrigerating of said coil and from other sources, stop means carried by said housing means in the path of movement of at least one of said tension rod means during contraction thereof to limit the extent of contraction of said one tension rod means and to provide the equivalent of a rigid connection of said one tension rod means to said housing means when said one tension rod means is prevented from further contraction by said stop means, and spring means operatively connected with said one tension rod means for yieldably opposing contraction thereof.

2. The combination of claim 1 and wherein said stop means provides for said one tension rod means an extent of contraction corresponding to that required by refrigerating of said coil and said other sources.

3. The combination of claim 2 and wherein said one tension rod means includes a tensioin rod connected to and extending from said support means, and an outer annular member carried by said tension rod in the position surrounding the latter and situated distant from said support means, said annular member having an inner end surface directed toward the interior of said housing means and said stop means having a surface directed away from the interior of said housing means and facing said inner end surface of said annular member, so that the latter surface advances toward said surface of said stop means during contraction of said one tension rod means.

4. The combination of claim 3 and wherein said spring means includes at least one cup spring surrounding said tension rod and having an outer peripheral portion situated between and engaging said surface of said stop means and said inner end surface of said annular member and urging the latter surface away from said surface of said stop means, said cup spring being fully compressed and acting as a rigid spacer between said annular member and said stop means when said tension rod means has contracted to the maximum extent provided by said stop means.

5. The combination of claim 4 and wherein said stop means has a lip projecting from said surface thereof and closely surrounding said annular member to guide the latter for movement with respect to said stop means.

6. The combination of claim 5 and wherein said lip has an inner surface of non-circular configuration and said annular member has next to said inner surface of said lip an exterior surface of non-circular configuration mating with the configuration of the inner surface of said lip, so that said annular member cannot turn with respect to said stop means.

7. The combination of claim 6 and wherein said annular member is internally threaded, an exteriorly threaded sleeve threaded into said annular member and having an internal annular shoulder directed away from the interior of said housing means, and a motion transmitting member engaging said shoulder and connected with said tension rod for transmitting contracting movement of the latter through said shoulder to said externally threaded sleeve and from the latter to said annular member, said sleeve and motion transmitting member forming together with said annular member and said tension rod the tension rod means which is operatively connected with said support means.

No references cited.

BERNARD A. GILHEANY, *Primary Examiner.*

C. E. WANDS, G. HARRIS, *Assistant Examiners.*